Figure 1:
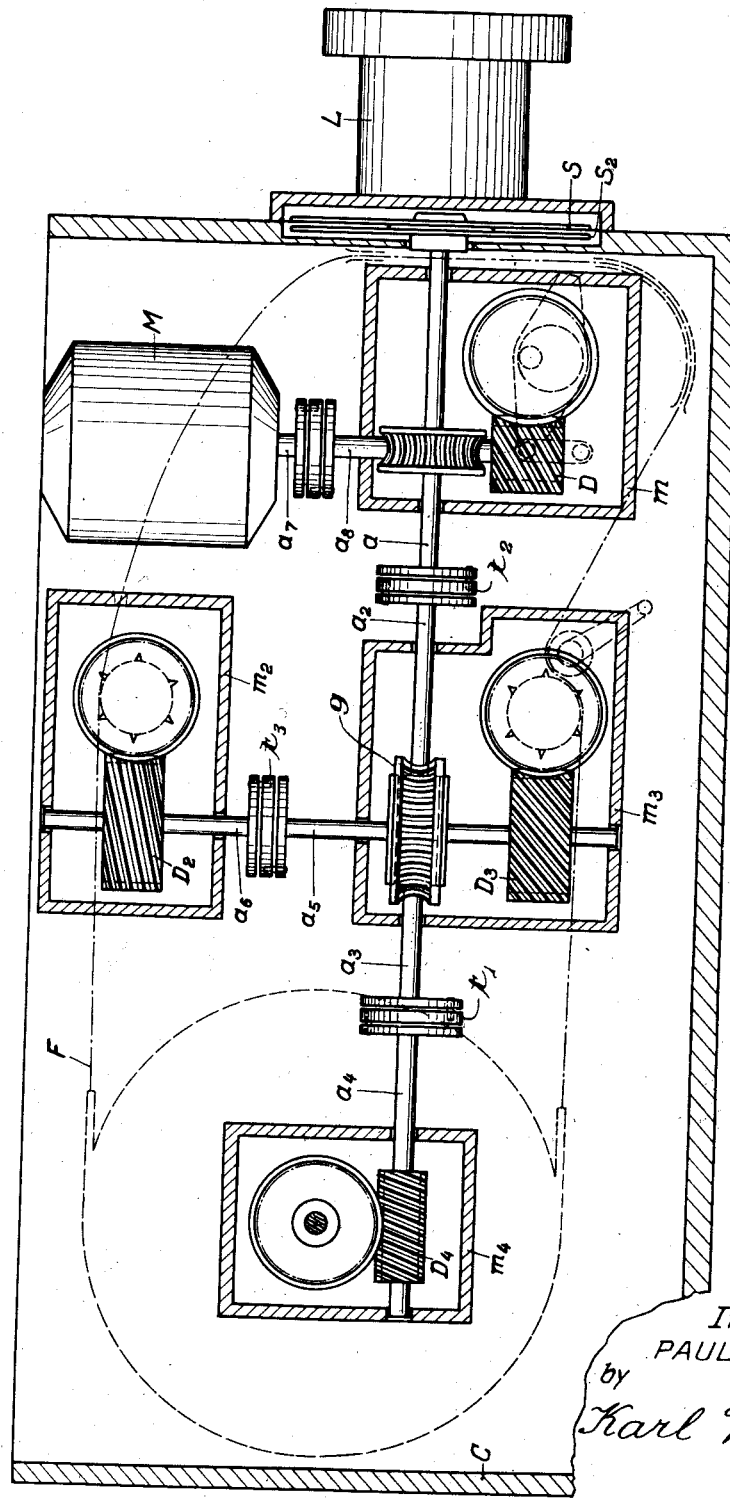

April 9, 1940.   P. HEINISCH   2,196,358
MOTION PICTURE CAMERA
Filed July 7, 1936   2 Sheets-Sheet 1

Inventor:
PAUL HEINISCH
by
Karl Viertel
Attorney

April 9, 1940.     P. HEINISCH     2,196,358
MOTION PICTURE CAMERA
Filed July 7, 1936     2 Sheets-Sheet 2

Inventor:
by PAUL HEINISCH
Karl Viertel
Attorney

Patented Apr. 9, 1940

2,196,358

UNITED STATES PATENT OFFICE 2,196,358

MOTION PICTURE CAMERA

Paul Heinisch, Berlin-Zehlendorf, Germany, assignor to Askania-Werke A. G., a corporation of Germany Application July 7, 1936, Serial No. 89,384
In Germany July 10, 1935

1 Claim. (Cl. 88—17)

My invention relates to motion picture cameras for obtaining multiple pictures or series of pictures on a flexible sensitized film, which is intermittently advanced past the exposure lens; and more especially to improvements in motion picture cameras of the type, which are cooperatively associated or jointly used with sound recording apparatus or systems.

As a matter of fact known to practitioners in this field sound recording apparatus prove to be occasionally highly sensitive to specific quaint sounds out of order and vibrations not audible to human beings, such as for instance produced by beads of perspiration dropping from an actor's or singer's chin to the floor; on reproducing the sounds recorded amongst the singer's voice said quaint sounds will be heard in a vastly magnified and strange fashion, comparable in the case mentioned to the sounds produced by the blows of a hammer.

Likewise certain clicking, knocking, grating and other specific noises and vibrations, however faint and gentle, as produced by the various gearings and mechanism closely assembled and used in motion picture cameras—for instance for intermittently feeding the sensitized film past the exposure lens, for re-winding the film, for operating the various shutters for making and timing the exposures—are apt to impair the immaculate recording for instance of conversation held at a low voice, of tender music and other delicate noises in the play; more so, since noise produced for instance by the striking of toothed gear wheels against each other, shocks, concussions, vibrations etc. apt to produce sounds, which occur in a rotary cam shaft, in a reciprocating, oscillating or intermittently operated machine element of one of the film actuating mechanisms indicated—say in the primary film feeding gear—are usually propagated through rigid power transmission members, capable of likewise vibrating, to the next following mechanism of the camera, namely the secondary film feeding gear and so on, wherein those noises and vibrations are repeated by reflection and are amplified by resonation and like phenomena.

It has already been proposed to enclose the film actuating mechanism of motion picture cameras within thick layers of felt; however this has the disadvantage, that the mechanisms concerned are less accessible to the operator, that the total weight and size of cameras so designed is considerably increased, and that their transport and attendance is impaired by their greater bulkiness.

The principal object of this invention is to overcome said drawbacks, namely to provide a motion picture camera of relatively light weight and small size, structurally so re-designed, that troublesome noises and vibrations produced therein and likely to impair the synchronous recording of sounds, are retained therein and prevented from being transmitted to the sound recording apparatus concerned.

One of the outstanding features of the motion picture camera re-designed according to this invention consists therein, that shocks, concussions, vibrations etc. occurring within the film feeding, exposing and re-winding mechanism are strictly localized therein.

Another salient feature of the invention is the provision of shock and vibration absorbing fixtures for fixing the various film actuating mechanism within the camera casing and for attaching them to partition walls, brackets or like supports provided therein.

Still other objects aimed at by this invention and advantages obtained will become evident hereinafter to experts in this field.

Figure 2:
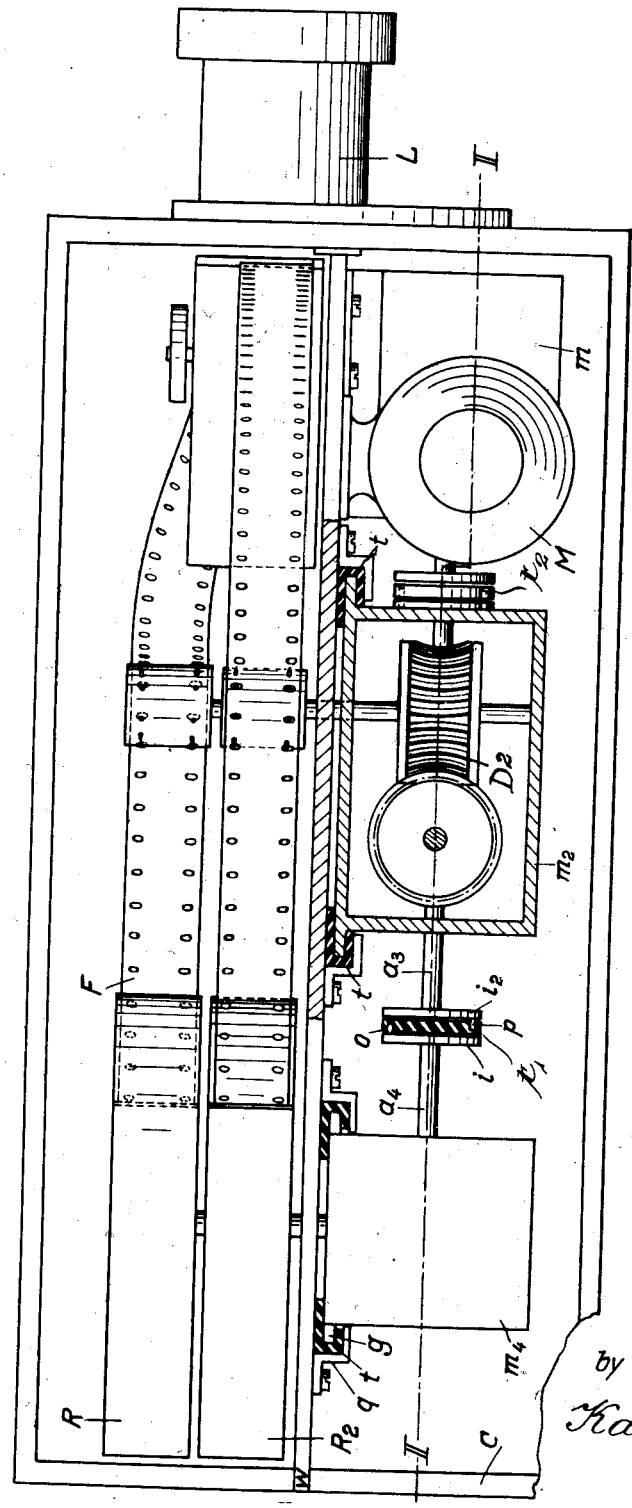

The nature and scope of the invention are briefly outlined in the appended claims and will be more fully understood from the following specification taken together with the accompanying drawings, in which Fig. 1 is a section taken on line II—II in Fig. 2 through a motion picture camera re-designed according to this invention and being diagrammatically shown by way of an example, Fig. 2 is a plan view, partly in section.

Briefly stated the invention comprises structurally re-designing and disjoining the various film operating mechanism concerned, so as to present separate units, cooperatively re-associating the latter with each other and their prime mover through a plurality of shock and vibration absorbing power transmission means, distinguished by the employment of at least one non-rigid coupling element, and fixing said film operating mechanisms to their supporting structures in the camera, such as partition walls, brackets and the like, by means of vibration absorbing fasteners.

In Figs. 1 and 2, where an embodiment of the invention is shown by way of an example, C designates the casing of the motion picture camera, L is the exposure lens, S—S₂ are rotary shutters for exposing the film F; the latter is enclosed in magazines R—R₂, wherein the film is unwound and rewound by means of reels (not shown).

D is a film feeding device of the intermittent grip type, D₂ and D₃ are auxiliary feeding devices for controlling the advance of the film to and from the feeding device D proper, driven from a gear $g$ on a shaft $a_5$.

$D_4$ is a device for re-winding the film on a reel (not shown), M is an electric motor for operating the various film feeding and exposing devices.

According to this invention the devices $$D-D_2-D_3-D_4$$

for feeding and re-winding the film are structurally segregated or detached from each other so as to present separate units; the respective driving and driven shafts of the latter, indicated at $a-a_2$, $a_3-a_4$, $a_5-a_6$, $a_7-a_8$, are coupled with each other by vibration absorbing power transmission means indicated at $t_1$, $t_2$, and $t_3$.

In the embodiment of the invention shown each power transmission means comprises as shown at $t_1$ coupling discs $i-i_2$ keyed to the respective shafts and having facial projections in the form of pins $p$, and an intermediary coupling member $o$ of leather, rubber or like elastic material into which said pins project.

The said film feeding devices $D_1$, $D_2$, $D_3$, $D_4$ may be mounted to advantage within frames indicated at $m$, $m_2$, $m_3$, $m_4$, which are adapted to be secured to their supports by means of vibration absorbing fasteners: In the embodiment of the invention shown by way of an example in the drawings said frames are formed with flanges $g$, and are fixed to a partition wall $w$ in the camera by means of clamps $q$ and layers of felt $t$, cloth, rubber or like insulating material.

Various other changes and modifications may be conveniently made in the structural details of motion picture cameras of the improved design described above, without substantially departing from the spirit and the salient ideas of this invention.

What I claim is:

In a motion picture camera of the class described, a casing having a partition wall dividing it into film and operating compartments; a motor in the operating compartment; separate main and auxiliary film feeding units and a film re-winding unit, each unit having a sound deadening housing supported on said partition wall also in said operating compartment; a sound deadening driving coupling between the motor shaft and the main film feeding unit; shafts connecting the units in succession and extending through the unit housing; means connecting the shafts to drive the mechanism of each of the units; and sound deadening driving couplings on the shafts between the housings of the successive adjacent units.

PAUL HEINISCH.